United States Patent
Kulkarni et al.

(10) Patent No.: US 11,928,963 B2
(45) Date of Patent: Mar. 12, 2024

(54) SYSTEM AND METHOD FOR TRACKING EGRESS TIMES FROM A PARKING FACILITY AND PROVIDING ACTION RECOMMENDATIONS

(71) Applicant: Honeywell International Inc., Charlotte, NC (US)

(72) Inventors: Amit B. Kulkarni, Medina, MN (US); Deepthi Sethuraman, Bengaluru (IN); Umesh Hosamani, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 199 days.

(21) Appl. No.: 17/521,701

(22) Filed: Nov. 8, 2021

(65) Prior Publication Data

US 2023/0141416 A1    May 11, 2023

(51) Int. Cl.
*G08G 1/0968*  (2006.01)
*G08G 1/01*  (2006.01)
(Continued)

(52) U.S. Cl.
CPC ..... *G08G 1/096838* (2013.01); *G08G 1/0125* (2013.01); *G08G 1/0145* (2013.01);
(Continued)

(58) Field of Classification Search
None
See application file for complete search history.

(56) References Cited

U.S. PATENT DOCUMENTS

| | | | |
|---|---|---|---|
| 5,091,727 A | 2/1992 | Mahmood | |
| 7,936,284 B2 * | 5/2011 | Levine | G08G 1/144 340/928 |

(Continued)

FOREIGN PATENT DOCUMENTS

| | | |
|---|---|---|
| KR | 102058708 B1 | 12/2019 |
| WO | 2013045835 A1 | 4/2013 |

OTHER PUBLICATIONS

Zou "A Study of Intelligent Parking Management in the Era of Big Data", Advances in Economics, Business and Management Research, vol. 85, 2nd International Conference on Economy, Management and Entreppreneurship (ICOEME 2019) pp. 644-647, Atlantis Press, 2019.

*Primary Examiner* — Daniel L Greene
*Assistant Examiner* — Daniel L Greene, Jr.
(74) *Attorney, Agent, or Firm* — Seager, Tufte & Wickhem, LLP (57) ABSTRACT

A method includes receiving vehicle data for a plurality of vehicles in a parking facility over time, the vehicle data including a time t1 indicating when each of the vehicles leaves its corresponding parking spot in the parking facility, and a time t2 indicating when each of the plurality of vehicles reaches an exit of the parking facility. An egress time is determined for each of the plurality of vehicles based at least in part on the corresponding times t1 and t2. A timestamp is assigned to each of the egress times, resulting in timestamped egress times. A current egress time of the parking facility is estimated based at least in part on the timestamped egress times. An action recommendation is based at least in part on the current egress time of the parking facility and is outputted for subsequent viewing by the driver of the particular vehicle.

20 Claims, 10 Drawing Sheets

(51) Int. Cl.
   *G08G 1/052*   (2006.01)
   *G08G 1/0967*   (2006.01)
   *H04W 4/44*   (2018.01)

(52) U.S. Cl.
   CPC ....... *G08G 1/052* (2013.01); *G08G 1/096775* (2013.01); *H04W 4/44* (2018.02)

(56) References Cited

U.S. PATENT DOCUMENTS

| | | | |
|---|---|---|---|
| 9,330,303 B2 | 5/2016 | Nerayoff et al. | |
| 10,169,996 B2* | 1/2019 | Liu | G08G 1/144 |
| 10,386,845 B1* | 8/2019 | Konrardy | G07C 5/0841 |
| 2002/0099574 A1 | 7/2002 | Cahill et al. | |
| 2004/0068433 A1* | 4/2004 | Chatterjee | G06Q 20/127 |
| | | | 705/13 |
| 2005/0021225 A1* | 1/2005 | Kantarjiev | G08G 1/0116 |
| | | | 701/119 |
| 2007/0031218 A1* | 2/2007 | Haag | E04H 6/422 |
| | | | 414/227 |
| 2012/0265434 A1* | 10/2012 | Woodard | G08G 1/147 |
| | | | 701/423 |
| 2012/0299749 A1* | 11/2012 | Xiao | G08G 1/148 |
| | | | 340/932.2 |
| 2014/0039987 A1* | 2/2014 | Nerayoff | G08G 1/14 |
| | | | 348/148 |
| 2014/0214499 A1 | 7/2014 | Hudson et al. | |
| 2014/0278086 A1 | 9/2014 | San Filippo et al. | |
| 2014/0294543 A1 | 10/2014 | Jrvinen et al. | |
| 2014/0309917 A1* | 10/2014 | Beaurepaire | G08G 1/144 |
| | | | 701/300 |
| 2015/0149263 A1* | 5/2015 | Stenneth | G07F 17/24 |
| | | | 705/13 |
| 2018/0164106 A1* | 6/2018 | Peterson | G01C 21/3617 |
| 2019/0212159 A1* | 7/2019 | Petersen | G05D 1/0278 |
| 2021/0074159 A1 | 3/2021 | Seo | |
| 2021/0256577 A1 | 8/2021 | Sen | |
| 2022/0165150 A1* | 5/2022 | Xu | G08G 1/0141 |
| 2023/0141416 A1* | 5/2023 | Kulkarni | G08G 1/0125 |
| | | | 701/423 |

* cited by examiner

SYSTEM AND METHOD FOR TRACKING EGRESS TIMES FROM A PARKING FACILITY AND PROVIDING ACTION RECOMMENDATIONS

TECHNICAL FIELD

The present disclosure pertains generally to systems for tracking traffic and more particularly to systems for tracking traffic flow within a parking structure.

BACKGROUND

Many commercial buildings include parking structures, including surface parking lots, multiple level above-grade parking structures and below-grade parking garages, for example. Some parking structures may have space for hundreds or even thousands of vehicles parked within the parking structure. It will be appreciated that the time needed to exit a large parking structure, particularly when a large number of other vehicles are attempting to exit at the same time, can be substantial. Being able to determine egress time, or the time needed for a vehicle to travel from its parking spot to an appropriate exit, may be beneficial in helping an individual plan when to leave. As an example, a person may decide to spend a little extra time in the office, rather than wasting time trying to exit the parking structure during a busy time. Alternatively, they may decide to leave the office early, so they can arrive home in time for an upcoming remote meeting. Depending on where the person intends to go after leaving the parking structure, knowing that a particular parking structure exit would yield a shorter egress time may be helpful in planning their departure. A particular route out of the particular parking structure may involve less traffic, or a shorter wait at the exit gate to pay, for example. A need remains for a system for improving traffic management within and/or around a parking structure.

SUMMARY

This disclosure relates generally to systems for tracking traffic flow within a parking structure and for providing departure and/or route recommendations based thereon. In an example, a method includes receiving vehicle data regarding each of a plurality of vehicles in a parking facility over time, the vehicle data including a time t1 indicating when each of the vehicles leaves its corresponding parking spot in the parking facility, and a time t2 indicating when each of the plurality of vehicles reaches an exit of the parking facility. An egress time is determined for each of the plurality of vehicles based at least in part on the corresponding times t1 and t2. In some cases, a timestamp is assigned to each of the egress times, resulting in timestamped egress times. A current egress time of the parking facility is estimated based at least in part on the timestamped egress times. An action recommendation is determined for a driver associated with a particular vehicle currently parked in the parking facility based at least in part on the current egress time of the parking facility. The action recommendation is outputted for subsequent viewing by the driver of the particular vehicle.

In another example, a system includes an input port, an output port and a controller that is operably coupled with the input port and the output port. The input port is configured to receive vehicle data regarding each of a plurality of vehicles in a parking facility over time, the vehicle data including a time t1 indicating when each of the vehicles leaves its corresponding parking spot in the parking facility, and a time t2 indicating when each of the plurality of vehicles reaches an exit of the parking facility. The controller is configured to determine an egress time for each of the plurality of vehicles based at least in part on the corresponding times t1 and t2, assign a timestamp to each of the egress times, resulting in timestamped egress times, estimate a current egress time of the parking facility based at least in part on the timestamped egress times, and determine an action recommendation for a driver associated with a particular vehicle currently parked in the parking facility based at least in part on the current egress time of the parking facility. The output port is configured to output the action recommendation for subsequent viewing by the driver of the particular vehicle.

In another example, a device includes a display, a cellular transceiver and a controller that is operably coupled with the cellular transceiver. The controller is configured to transmit a time t1 via the cellular transceiver indicating when a particular vehicle carrying the device leaves a parking spot within a parking facility, transmit a time t2 via the cellular transceiver indicating when the particular vehicle reaches an exit of the parking facility, receive an action recommendation for a driver associated with the particular vehicle based at least in part an egress trend that is based at least in part on times t1 and t2 received from other vehicles, and display the action recommendation on the display.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
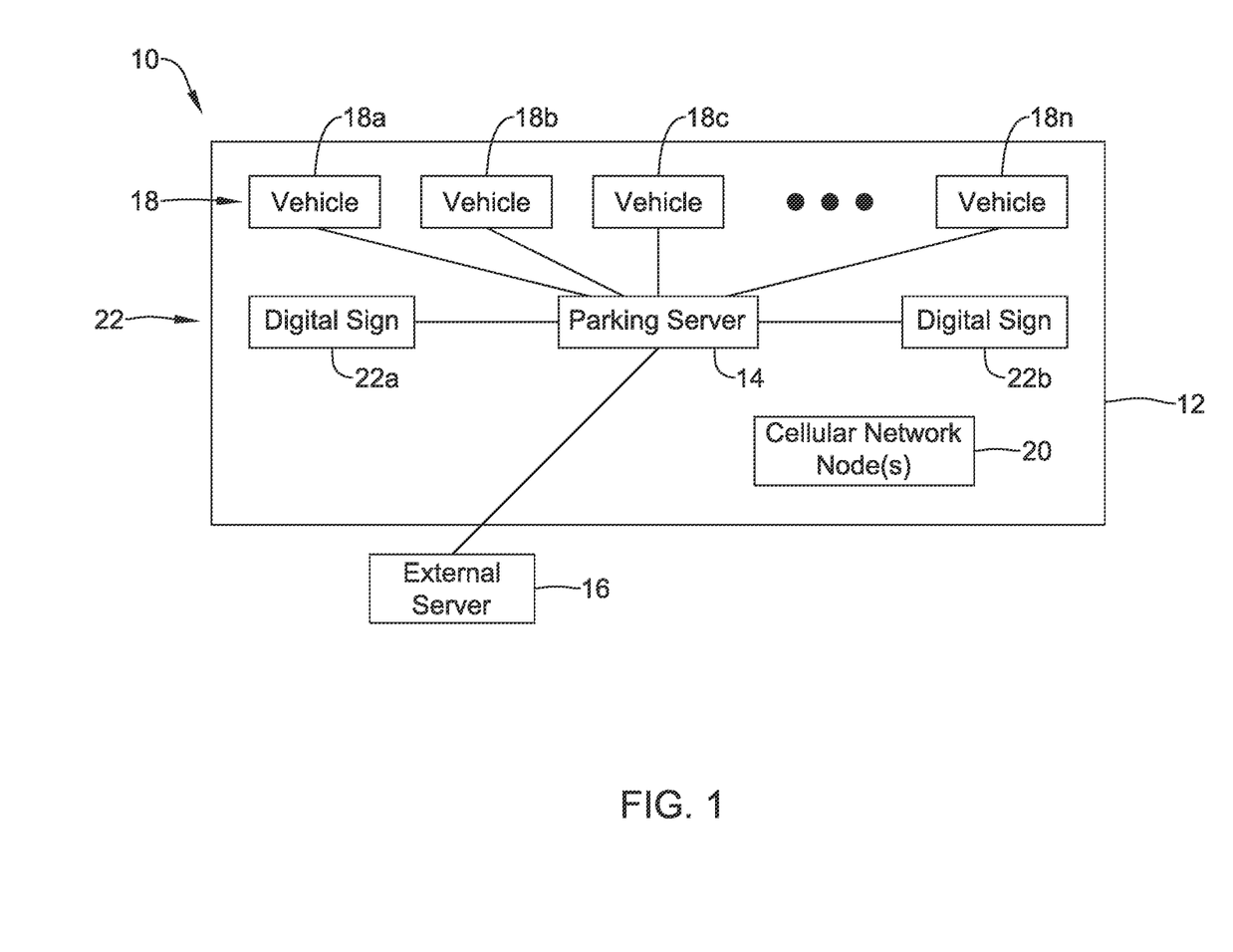
FIG. 1 is a schematic block diagram showing an illustrative parking system.

FIG. 1 is a schematic block diagram of an illustrative parking system 10 that may be deployed within a parking facility 12, including surface parking lots, multiple level parking ramps and underground parking garages. The parking system 10 includes a parking server 14 that monitors conditions within the parking facility 12 and is adapted to provide users such as vehicle drivers with suggestions as to an optimal route out of the parking facility 12, which parking structure exit may be best in terms of current congestion and/or the relationship of each parking structure exit to an optimal route to the driver's next destination, what time they need to leave in order to reach their next destination by a particular time, and so on.

The parking server 14, which may be an onsite computer or a cloud-based server, for example, may be configured to receive information from one or more external servers such as external server 16. The external server 16 may include a source of traffic information for the roads and highways external to the parking structure. The external server 16 may include a source of weather information, including current weather and forecasted future weather. In some instances, the external server 16 may include or have access to a source of scheduling information for one or more of the drivers who have parked vehicles within the parking facility 12. This may include calendar information, such as from a GMAIL calendar or an OUTLOOK calendar, for example. In some cases, the parking server 14 may function as both the parking server 14 and the external server 16.

A plurality of vehicles 18 may be parked within the parking facility 12 at any particular point in time. The vehicles 18 are individually labeled as 18a, 18b, 18c and through 18n. It will be appreciated that this is merely illustrative, as a large parking facility 12 may include hundreds or even thousands of vehicles 18 parked within the parking facility 12 at any point in time. As an example, large parking ramps located at major airports are large enough to hold thousands of vehicles 18.

Each of the vehicles 18 may be configured to communicate with the parking server 14. In some cases, each vehicle 18 may be equipped to communicate via a V2X (Vehicle to Everything) communications protocol. For some vehicles 18, the V2X communications protocol may be factory-built into the vehicle 18. For some vehicles 18, the V2X communications protocol may be built into an add-on device that has been installed in the vehicle 18 or placed within the vehicle and powered using a USB port, for example. In some cases, the V2X communications protocol may be implemented in a mobile device that is carried by the driver, such as but not limited to a smartphone. These are just examples.

In some cases, the V2X communications protocol is implemented within a 5G cellular communications network. The vehicles 18 may communicate with the parking server 14, and the parking server 14 may communicate with each of the vehicles 18, using a 5G cellular communications network. In some instances, the parking facility 12 may extend the 5G cellular communications network into the parking facility 14 by placing one or more local cellular network nodes 20 within the parking facility 12. The local cellular network nodes 20 may be configured to provide better cellular coverage to all parts of the parking facility 12 than may be available using the global 5G cellular communications network, particularly if the parking facility 12 is an underground parking garage. It will be appreciated that many parking ramps and parking garages are large structures built of steel-reinforced concrete. In some cases, the reinforcing steel may cause interference with the global 5G cellular communications network.

The illustrative parking system 10 includes a number of digital signs 22, individually labeled as 22a and 22b. While a total of two digital signs 22 are shown, it will be appreciated that this is merely illustrative, as the parking facility 12 may include any number of digital signs 22. Digital signs 22 may be installed at various locations within the parking facility 12. For example, there may be a digital sign 22 installed within each elevator lobby, or at various stair landings. In a multilevel parking ramp or underground parking garage, there may be digital signs 22 installed near where drivers pull from a parking level onto an exit path that leads to an exit from the parking facility 12 so that drivers can view whatever information is displayed on the digital sign 22 and decide whether to take that particular exit path, or to continue on to another exit path.

Figure 2:
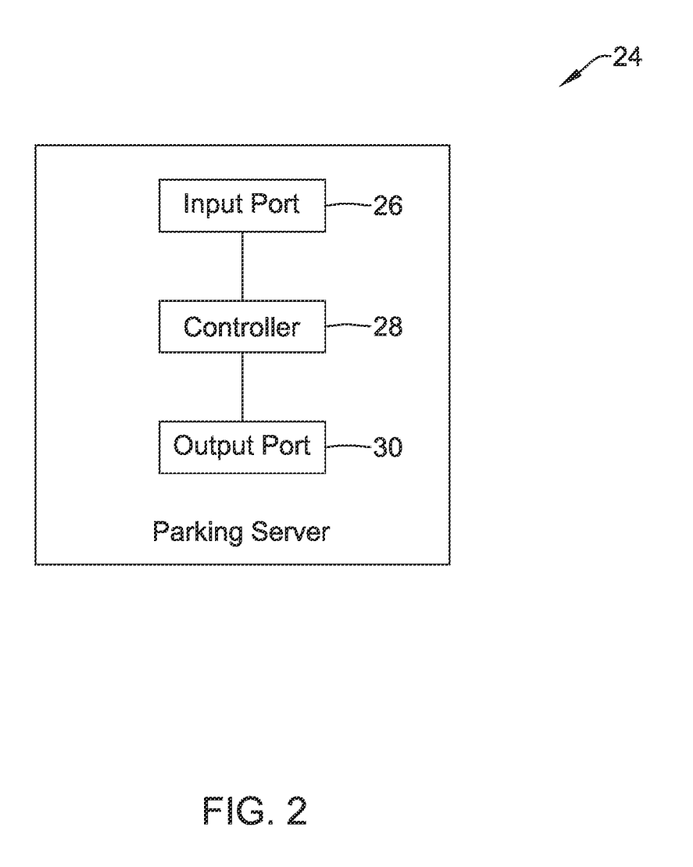
FIG. 2 is a schematic block diagram showing an illustrative device usable in the illustrative parking system of FIG. 1.

FIG. 2 is a schematic block diagram of an illustrative parking server 24 that may be considered as being an example of the parking server 14. The illustrative parking server 24 includes an input port 26. The input port 26 is configured to receive, over time, vehicle data regarding each of the plurality of vehicles 18 that are within the parking facility 12. The vehicle data may include a time t1 that indicates when each of the vehicles 18 leaves its corresponding parking spot in the parking facility 12, and a time t2 that indicates when each of the plurality of vehicles 18 reach an exit of the parking facility 12.

A controller 28 is operably coupled with the input port 26. The controller 28 is configured to determine an egress time for each of the plurality of vehicles 18 that is based at least in part on the corresponding times t1 and t2. In some cases, the egress time is equal to the difference between t2 and t1, for example. The controller 28 is configured to assign a timestamp to each of the egress times, resulting in timestamped egress times. The controller 28 is configured to estimate a current egress time of the parking facility 12 based at least in part on the timestamped egress times, and to determine an action recommendation for a driver associated with a particular vehicle 18 currently parked in the parking facility 12 based at least in part on the current egress time of the parking facility 12. An output port 30 is operably coupled with the controller 28 and is configured to output the action recommendation for subsequent viewing by the driver of the particular vehicle 18.

In some cases, the input port 26 may be configured to receive one or more of traffic information and weather information from, for example, the external server 16, and the controller 28 may be configured to determine a recommended route based at least in part on one or more of the traffic information and the weather information. The action recommendation may include a recommended route for the particular vehicle 18 to exit the parking facility 12 and/or to travel to a desired destination. The action recommendation may include a recommended time to leave the parking facility 12 to reach the desired destination along the recommended route by a desired time. In some cases, the input port 26 may be configured to receive calendar information from a calendar associated with the driver of the particular vehicle 18, wherein the calendar includes one or more of the desired destination and/or the desired time.

Figure 3:
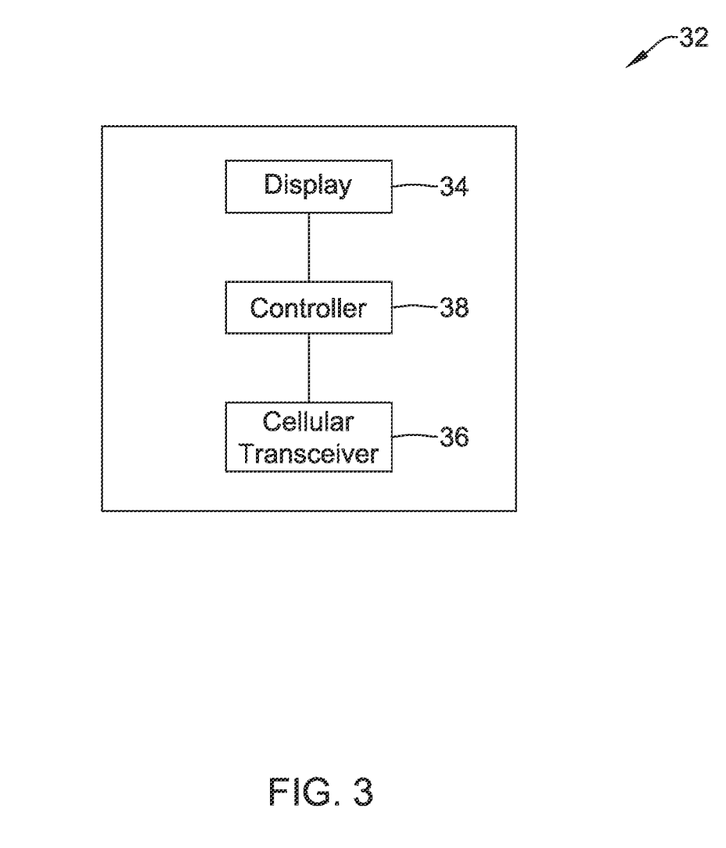
FIG. 3 is a schematic block diagram showing an illustrative device usable in the illustrative parking system of FIG. 1.

FIG. 3 is a schematic block diagram of an illustrative device 32 that may communicate with the parking server 14 or the parking server 24. In some cases, the device 32 provides a vehicle 18 with V2X communications protocol functionality. The device 32 may be built into the vehicle 18, or may be temporarily deployed within the vehicle 18. The illustrative device 32 includes a display 34, a cellular transceiver 36 and a controller 38. In some cases, the display 34 may be a flat screen LCD display. In some instances, the display 34 may be a touch screen display, and thus the user is able to enter information via the touch screen display, if appropriate. The cellular transceiver 36 may be a 5G cellular transceiver, for example. The controller 38 is operably coupled with the cellular transceiver 36.

The controller 38 may include a location service that determines a location of the device 32. The location service may determine the location of the device 32 using one or more of GPS, cellular triangulation, WiFi hotspots, Bluetooth beacons, and/or any other suitable locating technique. When the cellular transceiver 36 is a 5G cellular transceiver, the location service may be able to determine the location of the device 32 very accurately, such as within inches or feet, and may do so with low latency, such as in 1 second or less.

In one example, the location service of the device 32 is configured to detect when the device 32 (and thus the vehicle) leaves a parking spot within the parking facility 12 and when the device 32 reaches an exit of the parking facility 12. The controller 28 is configured to transmit a time t1 via the cellular transceiver 36 indicating when the corresponding vehicle 18 carrying the device 32 leaves the parking spot within the parking facility 12 and to transmit a time t2 via the cellular transceiver 36 indicating when the corresponding vehicle 18 reaches an exit of the parking facility 12. The controller 38 is also configured to receive an action recommendation for a driver associated with the corresponding vehicle 18 based at least in part an egress trend that is based at least in part on times t1 and t2 received from other vehicles 18, and to display the action recommendation on the display 34 of the device 32.

Figure 4:
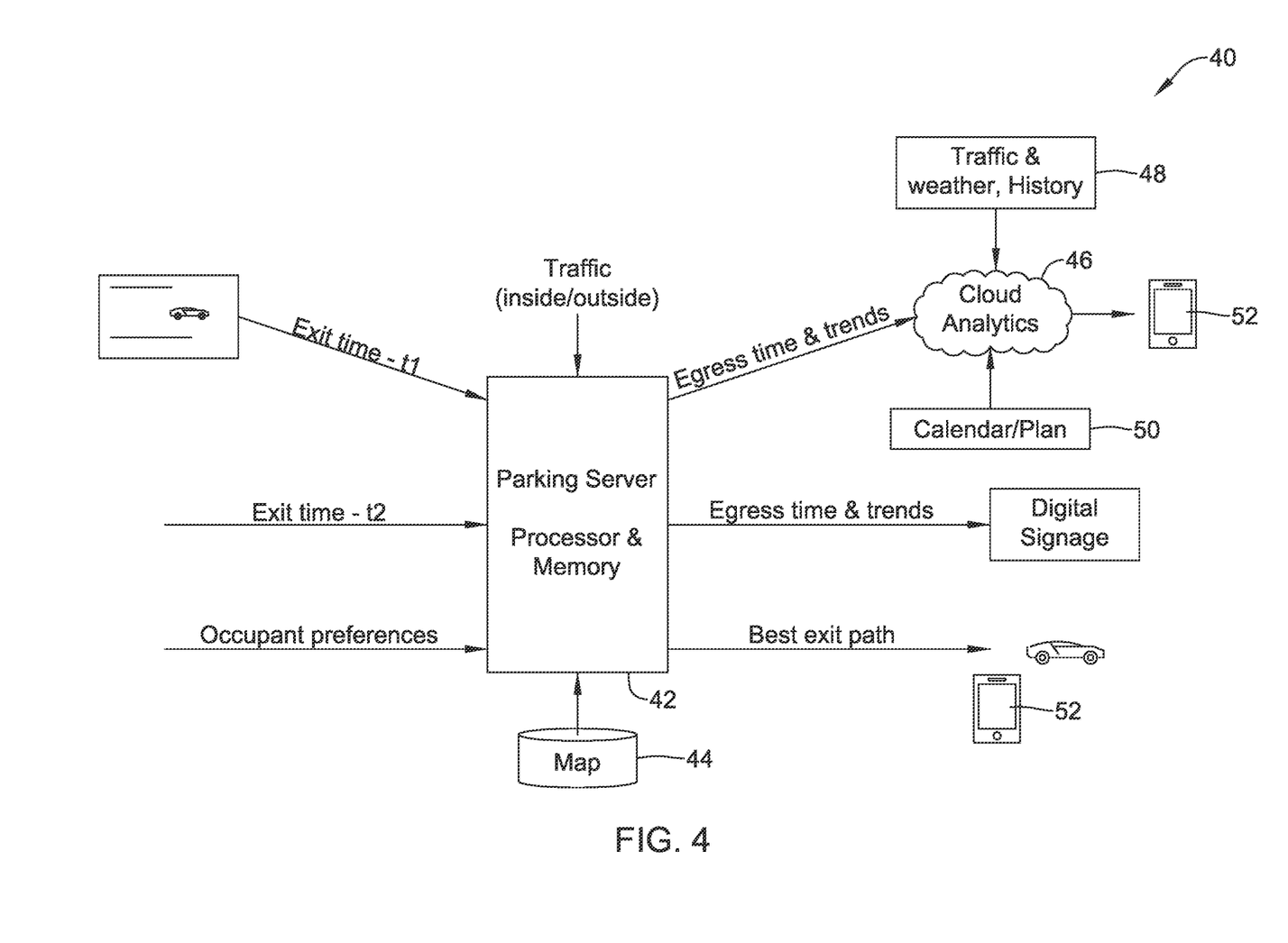
FIG. 4 is a schematic block diagram showing an illustrative parking system.

FIG. 4 is a schematic block diagram of an illustrative parking system 40. The illustrative parking system 40 may be considered as being an example of the parking system 10. Features described with respect to the parking system 10 may be incorporated into the parking system 40. Similarly, features described with respect to the parking system 40 may be incorporated into the parking system 10. The illustrative parking system 40 includes a parking server 42 that may be considered as being an example of the parking server 14 or the parking server 24. The parking server 42 includes a processor and memory, and is configured to create and maintain a map 44 of the parking structure and/or surrounding area. The map 44 may also be populated with current traffic conditions in and/or around the parking facility 12. For example, the map 44 may include color coding showing slow traffic in the parking facility 12 in red, normally moving traffic in green and perhaps intermediate traffic in yellow. The map 44 may include displays of egress times in various parts of the parking facility 12, for example.

As shown, inputs to the parking server 42 include a t1 exit time (e.g. time when a corresponding vehicle left a parking spot) and a t2 exit time (e.g. time when the corresponding vehicle reached the exit of the parking facility). The t1 exit time and the t2 exit time may be transmitted to the parking server 42 from each vehicle 18 exiting the parking facility 12 as well as occupant preferences. The t1 exit time and the t2 exit time are used by the parking server 42 to get a sense of current traffic levels, i.e., how long it takes for a vehicle 18 in a particular part of the parking facility 12 to exit the parking facility 12. The occupant preferences include but are not limited to home address, address for a different destination on a particular day and time, restrictions such as a deadline for reaching a particular destination, for example.

In some cases, the parking server 42 communicates with cloud-based analytics 46. The cloud-based analytics 46 may receive traffic, weather and history information 48, such as from an external server such as the external server 16. The cloud-based analytics 46 may receive egress time and egress time trend data from the parking server 42. The cloud-based analytics 46 may also receive calendar information 50 from an external server such as the external server 16. The cloud-based analytics 46 may output suggestions such as an optimal time to leave, an optimal path through the parking facility 12, and/or perhaps the best route for the particular vehicle 18 to take in reaching their destination. This may include directing the particular vehicle 18 to a specific exit that either has less of a wait time, and/or aligns better with the best route for reaching their particular destination.

The suggestions or recommendations may be outputted to devices 52 of a user of a particular vehicle 18 in the parking facility 12. The devices 52, which may be considered as an example of the device 32, may be built into the particular vehicles 18 or may be temporarily disposed within the particular vehicles 18. In some cases, the devices 52 may represent smartphones belonging to the drivers of particular vehicles 18, for example.

Figure 5:
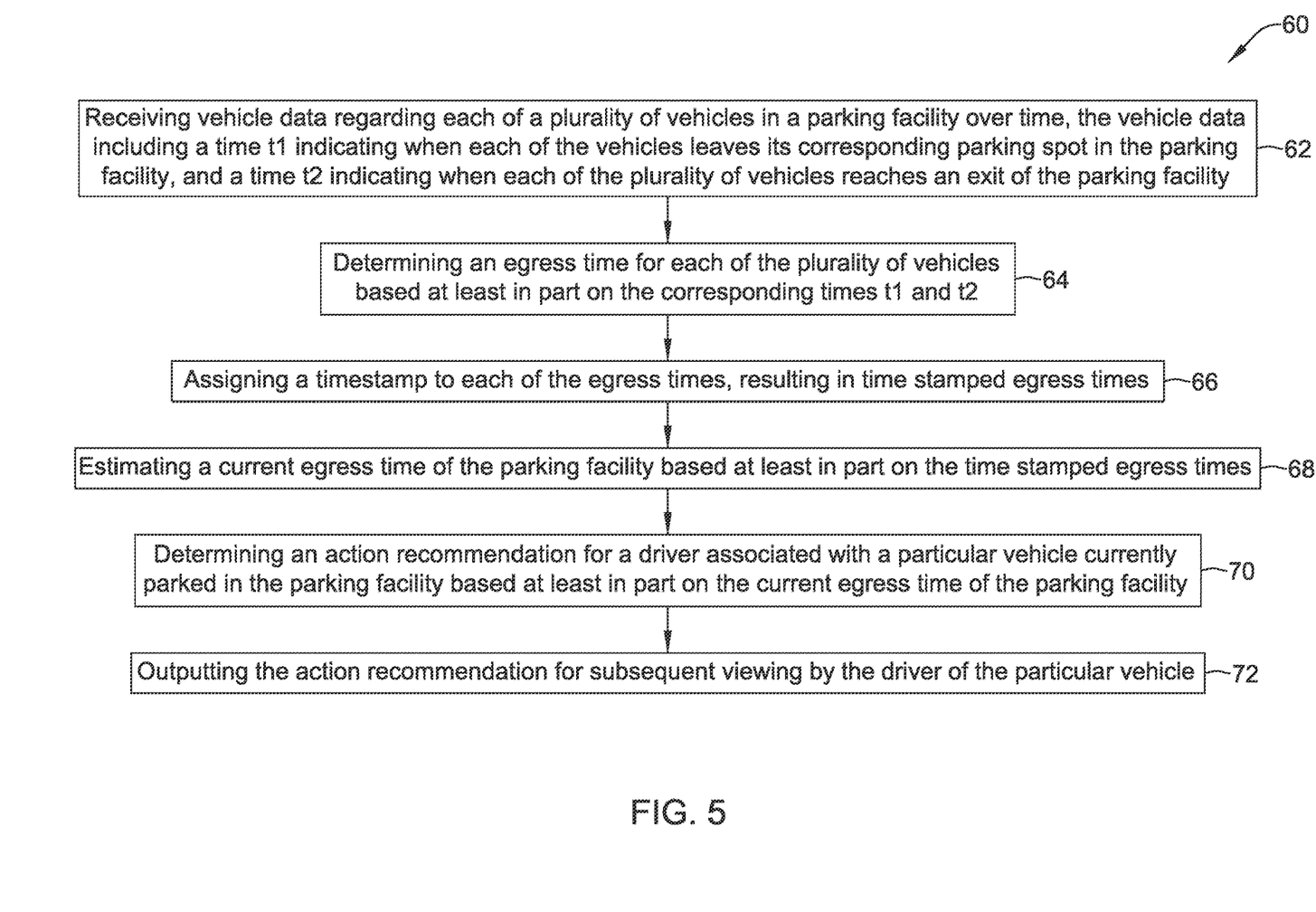
FIG. 5 is a flow diagram showing an illustrative method.

FIG. 5 is a flow diagram showing an illustrative method 60 that may be carried out via the parking system 10 or the parking system 40. Vehicle data regarding each of a plurality of vehicles (such as the vehicles 18) in a parking facility (such as the parking facility 12) over time is received, the vehicle data including a time t1 indicating when each of the vehicles leaves its corresponding parking spot in the parking facility, and a time t2 indicating when each of the plurality of vehicles reaches an exit of the parking facility, as indicated at block 62. In some cases, the vehicle data may be received from a plurality of V2X 5G devices each associated with a corresponding one of the plurality of vehicles in the parking facility.

An egress time for each of the plurality of vehicles is determined based at least in part on the corresponding times t1 and t2, as indicated at block 64. A timestamp is assigned to each of the egress times, resulting in timestamped egress times, as indicated at block 66. In some cases, the timestamp that is assigned to each of the egress times may correspond to the time t2 that was used in determining the corresponding egress time, but this is not required.

A current egress time of the parking facility is estimated based at least in part on the timestamped egress times, as indicated at block 68. In some cases, one or more egress time trends and/or patterns may be determined based at least in part on the timestamped egress times to help predict future egress times. An action recommendation is determined for a driver associated with a particular vehicle currently parked in the parking facility based at least in part on the current egress time of the parking facility (and/or on predicted future egress times), as indicated at block 70. The action recommendation may include a recommended route for the particular vehicle to exit the parking facility. The action recommendation may include a recommended departure time from the parking facility. The action recommendation is outputted for subsequent viewing by the driver of the particular vehicle, as indicated at block 72.

Figure 6:
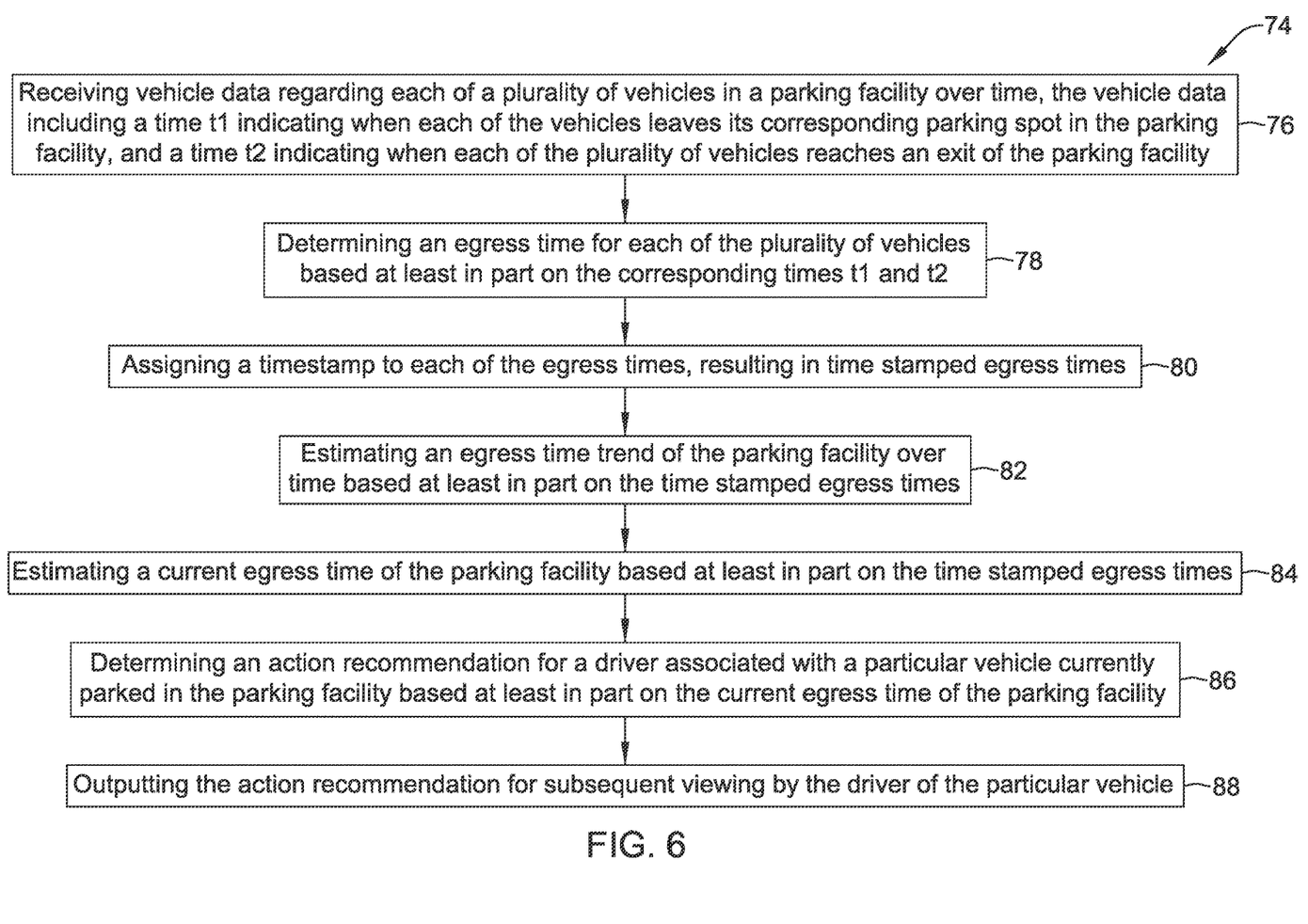
FIG. 6 is a flow diagram showing an illustrative method.

FIG. 6 is a flow diagram showing an illustrative method 74 that may be carried out via the parking system 10 or the parking system 40. Vehicle data regarding each of a plurality of vehicles (such as the vehicles 18) in a parking facility (such as the parking facility 12) over time is received, the vehicle data including a time t1 indicating when each of the vehicles leaves its corresponding parking spot in the parking facility, and a time t2 indicating when each of the plurality of vehicles reaches an exit of the parking facility, as indicated at block 76. An egress time for each of the plurality of vehicles is determined based at least in part on the corresponding times t1 and t2, as indicated at block 78. A timestamp is assigned to each of the egress times, resulting in timestamped egress times, as indicated at block 80. In some cases, the timestamp that is assigned to each of the egress times may correspond to the time t2 that was used in determining the corresponding egress time, but this is not required.

An egress time trend of the parking facility over time may be estimated based at least in part on the timestamped egress times, as indicated at block 82. A current and/or future egress time of the parking facility is estimated based at least in part on the egress time trends, as indicated at block 84. An action recommendation is determined for a driver associated with a particular vehicle currently parked in the parking facility based at least in part on the current egress time and/or a future egress time of the parking facility, as indicated at block 86. The action recommendation may include a recommended route for the particular vehicle to exit the parking facility. The action recommendation is outputted for subsequent viewing by the driver of the particular vehicle, as indicated at block 88.

Figure 7:
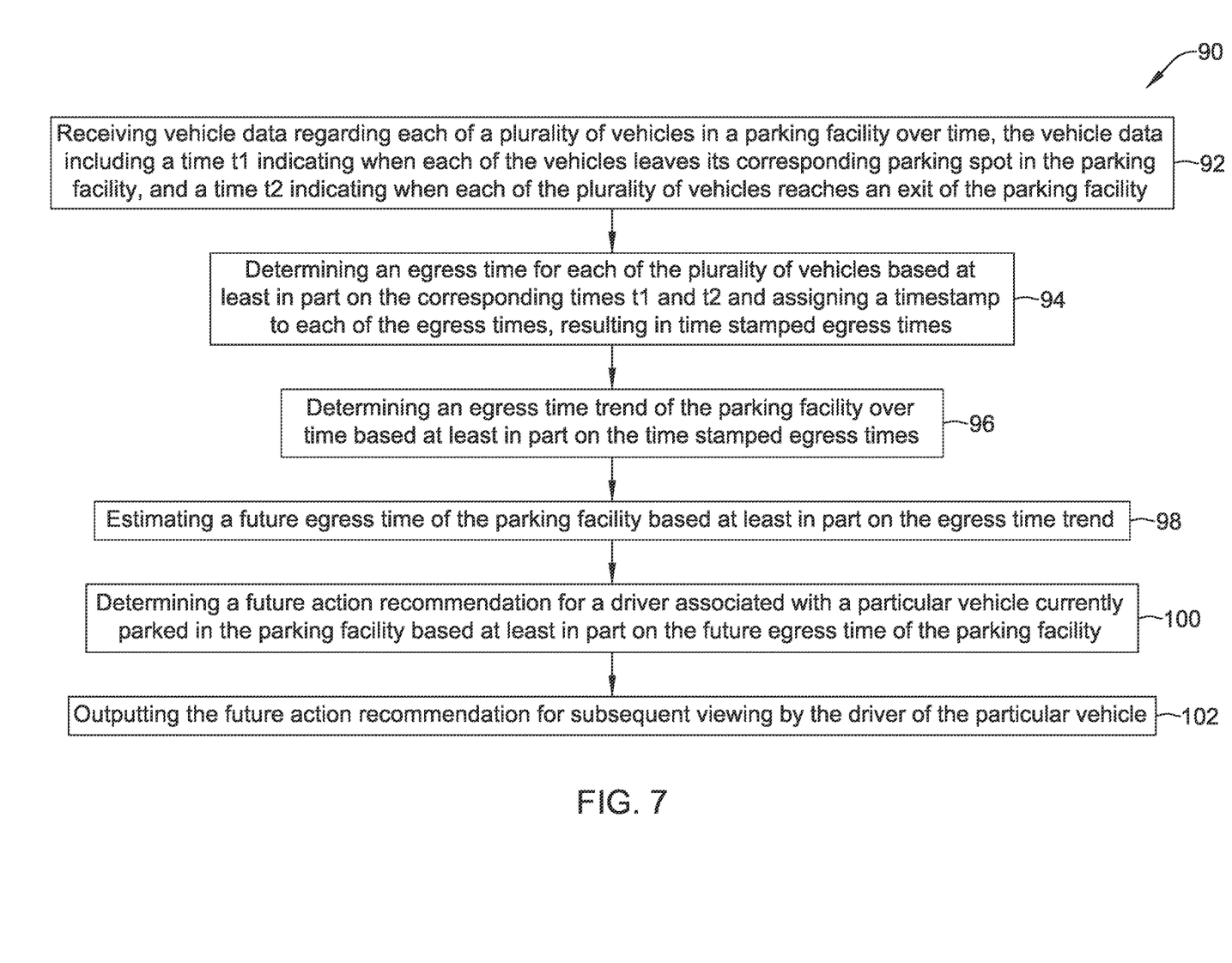
FIG. 7 is a flow diagram showing an illustrative method.

FIG. 7 is a flow diagram showing an illustrative method 90 that may be carried out via the parking system 10 or the parking system 40. Vehicle data regarding each of a plurality of vehicles (such as the vehicles 18) in a parking facility (such as the parking facility 12) over time is received, the vehicle data including a time t1 indicating when each of the vehicles leaves its corresponding parking spot in the parking facility, and a time t2 indicating when each of the plurality of vehicles reaches an exit of the parking facility, as indicated at block 92.

An egress time for each of the plurality of vehicles is determined based at least in part on the corresponding times t1 and t2, and a timestamp is assigned to each of the egress times, resulting in timestamped egress times, as indicated at block 94. An egress time trend of the parking facility over time is determined based at least in part on the timestamped egress times, as indicated at block 96. A future egress time of the parking facility is estimated, based at least in part on the egress time trend, as indicated at block 98.

A future action recommendation for a driver associated with a particular vehicle currently parked in the parking facility is determined, based at least on the future egress time of the parking facility, as indicated at block 100. The future action recommendation is outputted for subsequent viewing by the driver of the particular vehicle, as indicated at block 102.

Figure 8:
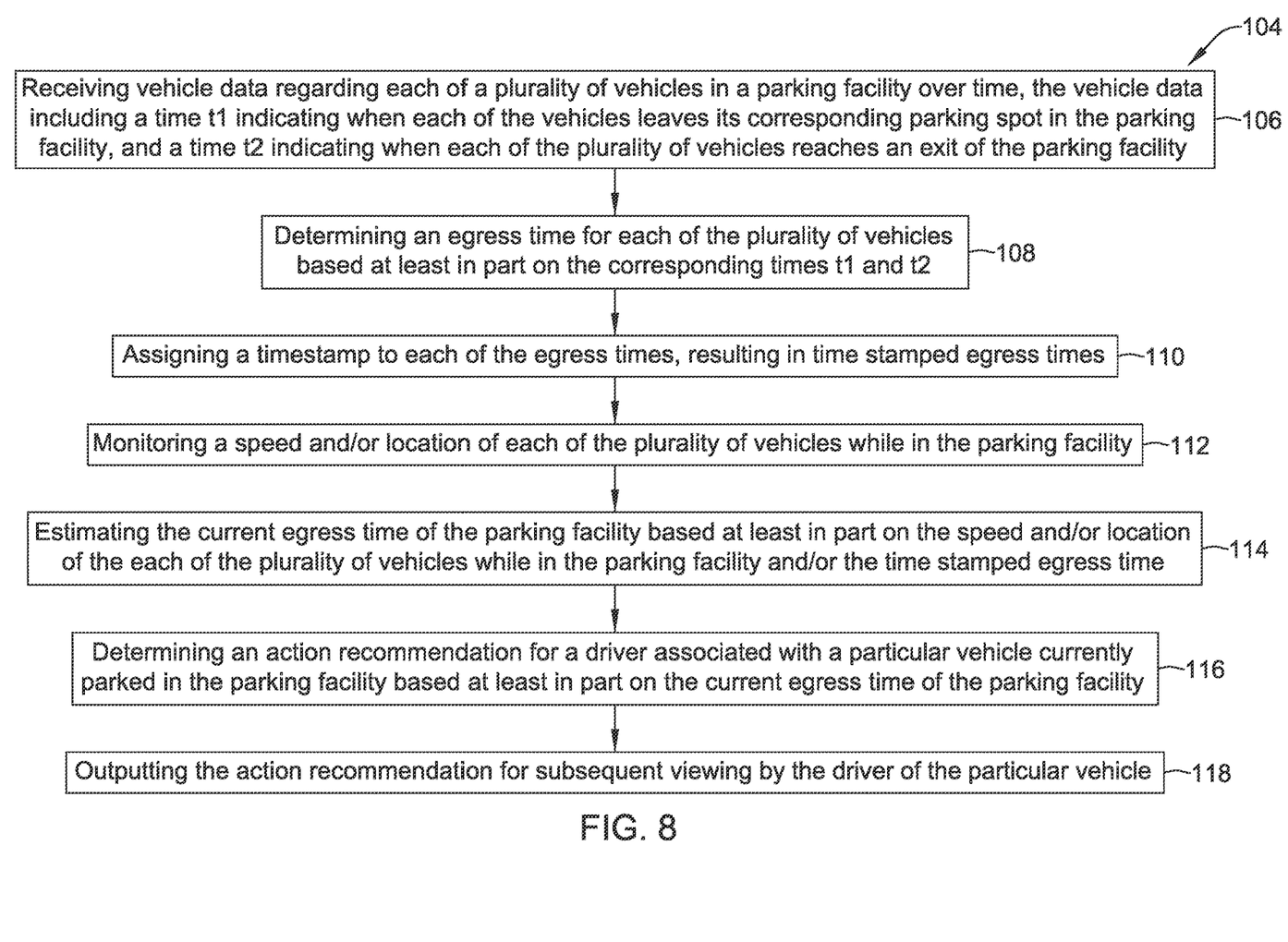
FIG. 8 is a flow diagram showing an illustrative method.

FIG. 8 is a flow diagram showing an illustrative method 104 that may be carried out via the parking system 10 or the parking system 40. Vehicle data regarding each of a plurality of vehicles (such as the vehicles 18) in a parking facility (such as the parking facility 12) over time is received, the vehicle data including a time t1 indicating when each of the vehicles leaves its corresponding parking spot in the parking facility, and a time t2 indicating when each of the plurality of vehicles reaches an exit of the parking facility, as indicated at block 106. An egress time for each of the plurality of vehicles is determined based at least in part on the corresponding times t1 and t2, as indicated at block 108. A timestamp is assigned to each of the egress times, resulting in timestamped egress times, as indicated at block 110. In some cases, the timestamp that is assigned to each of the egress times may correspond to the time t2 that was used in determining the corresponding egress time, but this is not required.

In the example show, a speed and/or location of each of the vehicles while in the parking facility is monitored, as indicated at block 112. An egress time trend of the parking facility over time may be estimated based at least in part on the speed and/or location of each of the vehicles while in the parking facility and/or at least in part on the timestamped egress times, as indicated at block 114. In some cases, the speed and/or location of each of the vehicles may be tracked via location services that use 5G. An action recommendation is determined for a driver associated with a particular vehicle currently parked in the parking facility based at least in part on the current egress time of the parking facility, as indicated at block 116. The action recommendation may include, for example, a recommended route for the particular vehicle to exit the parking facility, a recommended route to a desired destination, and/or a recommended time to leave the parking spot to reach a desired destination by a desired time. The action recommendation is outputted for subsequent viewing by the driver of the particular vehicle, as indicated at block 118.

Figure 9:
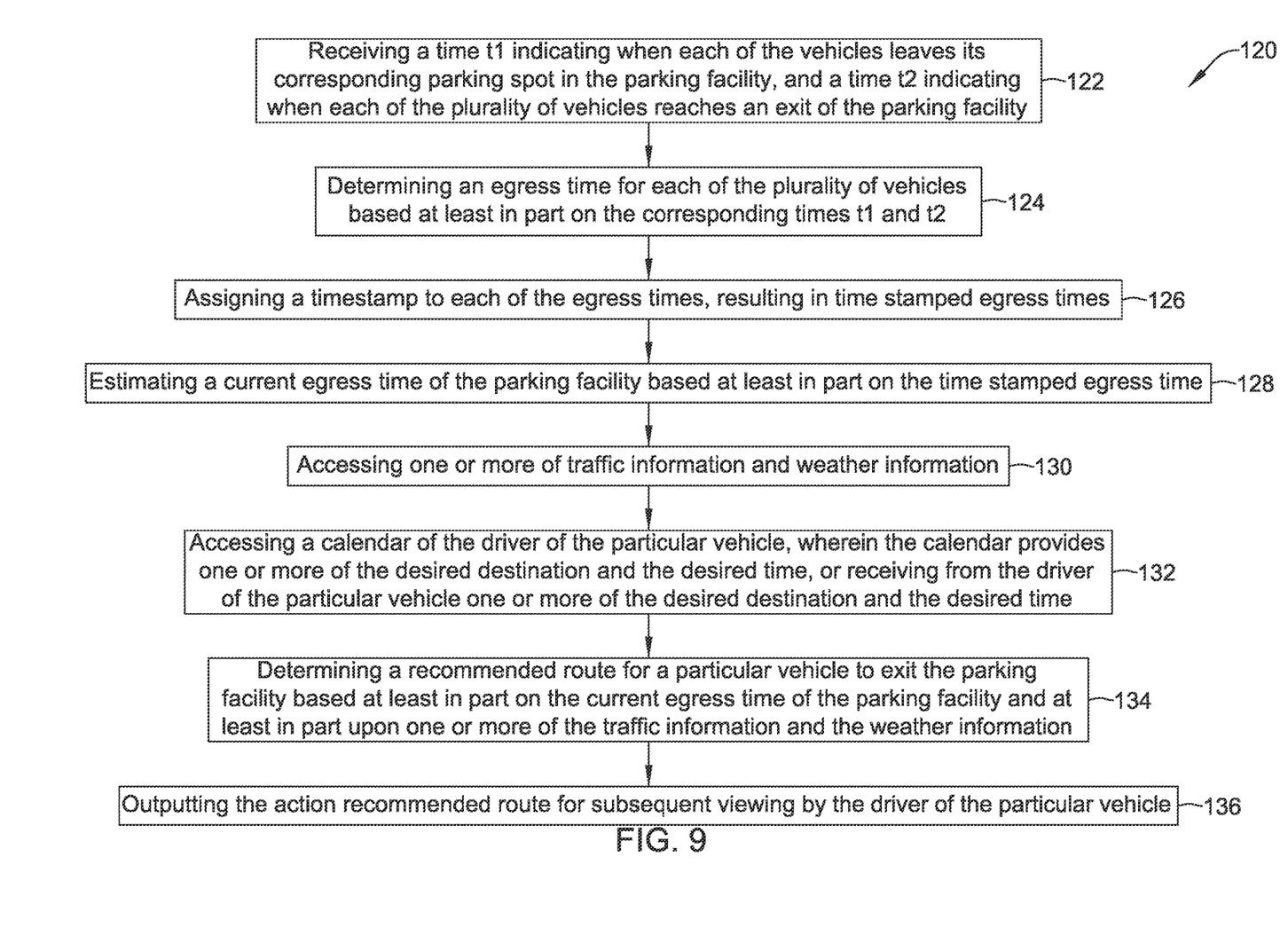
FIG. 9 is a flow diagram showing an illustrative method.

FIG. 9 is a flow diagram showing an illustrative method 120 that may be carried out via the parking system 10 or the parking system 40. Vehicle data regarding each of a plurality of vehicles (such as the vehicles 18) in a parking facility (such as the parking facility 12) over time is received, the vehicle data including a time t1 indicating when each of the vehicles leaves its corresponding parking spot in the parking facility, and a time t2 indicating when each of the plurality of vehicles reaches an exit of the parking facility, as indicated at block 122. An egress time for each of the plurality of vehicles is determined based at least in part on the corresponding times t1 and t2, as indicated at block 124. A timestamp is assigned to each of the egress times, resulting in timestamped egress times, as indicated at block 126. In some cases, the timestamp that is assigned to each of the egress times may correspond to the time t2 that was used in determining the corresponding egress time, but this is not required.

A current egress time of the parking facility may be estimated based at least in part on the timestamped egress times, as indicated at block 128. One or more of traffic information and weather information may be accessed, as indicated at block 130. In some cases, a calendar of the driver of the particular vehicle may be accessed, where the calendar provides one or more of the desired destination and the desired time, or the driver may directly provide this information, as indicated at block 132. A recommended route is determined for a particular vehicle based at least in part on one or more of the traffic information and the weather information, as indicated at block 134. The recommended route may include a recommended exit from the parking facility and/a path for the vehicle to take to reach their desired destination after exiting the parking facility. Calendar information may also play a part. For example, the calendar information may provide a desired time of arrival at the desired destination. When so provided, a recommended departure time may be provided along with the recommended route to help ensure that the driver reaches the desired destination by the desired time of arrival. The recommended route and/or recommended departure time is outputted for subsequent viewing by the driver of the particular vehicle, as indicated at block 136.

Figure 10:
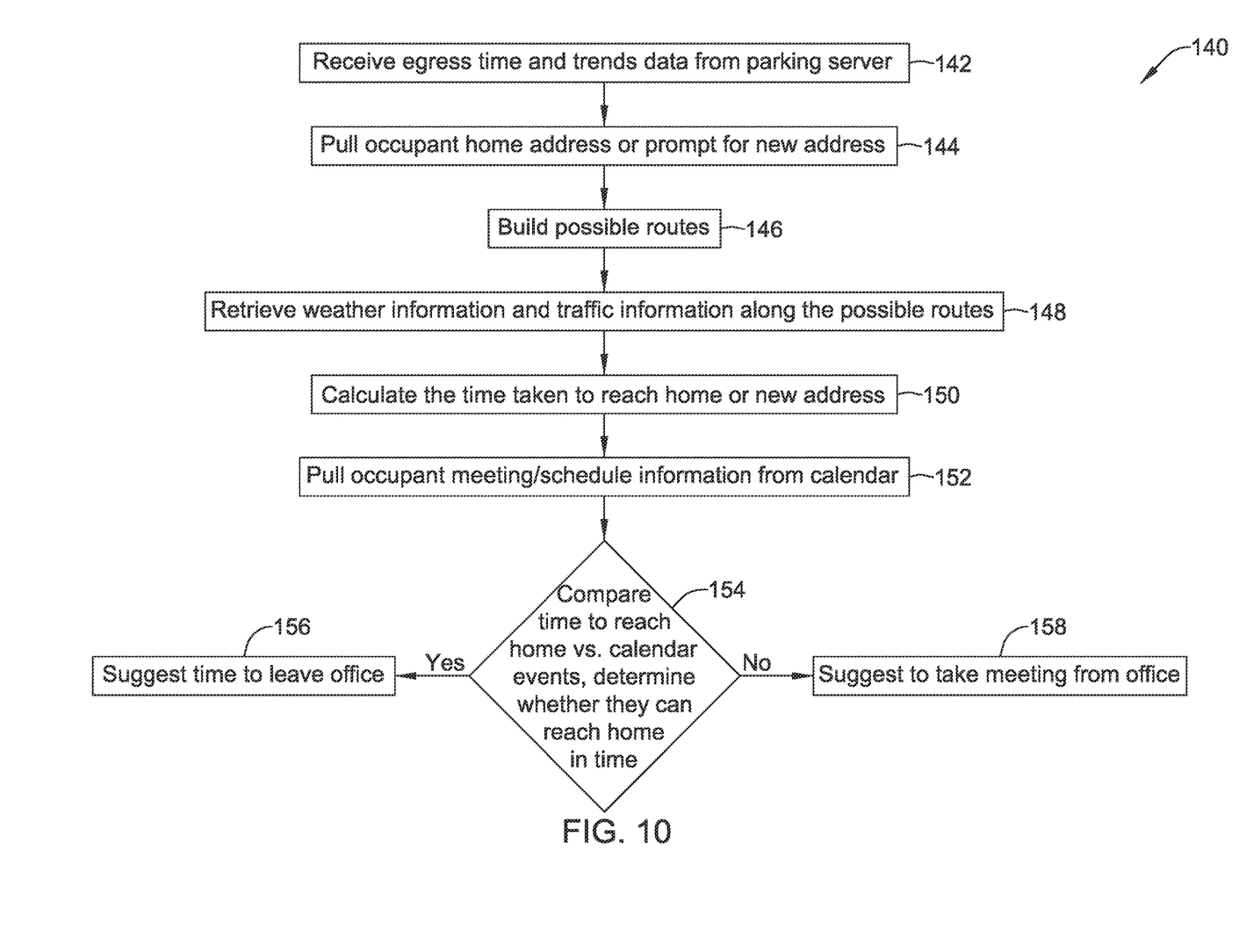
FIG. 10 is a flow diagram showing an illustrative method.

FIG. 10 is a flow diagram showing an illustrative method 140 that may be carried out via the parking system 10 or the parking system 40. In some cases, the illustrative method 140 may be carried out in a cloud-based server, such as the cloud-based analytics 46 shown in FIG. 4. Egress time and trend data may be received from the parking server, as indicated at block 142. The occupant home address may be pulled from memory, or the driver may be prompted for this information, as indicated at block 144. Possible routes from the parking facility to the occupant home address may be built, as indicated at block 146. Weather information and traffic information along the possible routes may be retrieved, as indicated at block 148.

The time that will be required to reach home or another destination may be determined, as indicated at block 150. Scheduling information may be pulled from a calendar source, as indicated at block 152. In the example shown, a determination is made at decision block 154 as to whether the user has enough time to reach their home or other destination in time to participate in their next scheduled meeting in their calendar. If there is enough time to get home, control passes to block 156 and the user is provided with a suggested time to leave the office so that they reach home in time for the scheduled meeting. If, however, there is not enough time to reach home, control passes to block 158 and the user is suggested to wait at the office to take the meeting.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method comprising:
   receiving vehicle data regarding each of a plurality of vehicles in a parking facility over time, the vehicle data including a time t1 indicating when each of the vehicles leaves its corresponding parking spot in the parking facility before reaching an exit of the parking facility, and a time t2 indicating when each of the plurality of vehicles reaches the exit of the parking facility;
   determining an egress time for each of the plurality of vehicles to egress the parking facility based at least in part on the corresponding times t1 and t2;
   assigning a timestamp to each of the egress times, resulting in timestamped egress times;
   estimating a current egress time of the parking facility based at least in part on the timestamped egress times;
   determining an action recommendation for a driver associated with a particular vehicle currently parked in the parking facility based at least in part on the current egress time of the parking facility; and
   outputting the action recommendation for subsequent viewing by the driver of the particular vehicle.

2. The method of claim 1, further comprising:
   determining an egress time trend of the parking facility over time based at least in part on the timestamped egress times; and
   estimating the current egress time of the parking facility based at least in part on the egress time trend.

3. The method of claim 1, further comprising:
   determining an egress time trend of the parking facility over time based at least in part on the timestamped egress times;
   estimating a future egress time of the parking facility based at least in part on the egress time trend; and
   wherein the action recommendation is a future action recommendation for the driver of the particular vehicle currently parked in the parking facility that is based at least in part on the future egress time of the parking facility.

4. The method of claim 1, wherein the timestamp that is assigned to each of the egress times corresponds to the time t2 that was used in determining the corresponding egress time.

5. The method of claim 1, further comprising:
   monitoring a speed of each of the plurality of vehicles while in the parking facility; and
   estimating the current egress time of the parking facility based at least in part on the speed of the each of the plurality of vehicles while in the parking facility.

6. The method of claim 1, further comprising:
   monitoring a speed and a location of each of the plurality of vehicles while in the parking facility; and
   estimating the current egress time of the parking facility based at least in part on the speed and the location of the each of the plurality of vehicles while in the parking facility.

7. The method of claim 1, wherein determining the action recommendation comprises determining a recommended route for the particular vehicle within the parking facility to exit the parking facility.

8. The method of claim 1, wherein determining the action recommendation comprises determining a recommended time to leave the parking spot of the parking facility.

9. The method of claim 1, wherein the vehicle data is received from a plurality of V2X 5G devices each associated with a corresponding one of the plurality of vehicles in the parking facility.

10. The method of claim 1, wherein determining the action recommendation comprises determining a recommended route for the particular vehicle to travel within the parking facility to exit the parking facility and to travel to a desired destination.

11. The method of claim 10, further comprises:
    accessing one or more of traffic information and weather information; and
    determining the recommended route is based at least in part on one or more of the traffic information and the weather information.

12. The method of claim 11, wherein determining the action recommendation comprises determining a recommended time to leave the parking spot of the parking facility to reach the desired destination along the recommended route by a desired time.

13. The method of claim 12, further comprising:
accessing a calendar of the driver of the particular vehicle, wherein the calendar provides one or more of the desired destination and the desired time.

14. The method of claim 12, further comprising:
receiving from the driver of the particular vehicle one or more of the desired destination and the desired time.

15. A system comprising:
an input port configured to:
receive vehicle data regarding each of a plurality of vehicles in a parking facility over time, the vehicle data including a time t1 indicating when each of the vehicles leaves its corresponding parking spot in the parking facility before reaching an exit of the parking facility, and a time t2 indicating when each of the plurality of vehicles reaches the exit of the parking facility;
a controller operably coupled with the input port, the controller configured to:
determine an egress time for each of the plurality of vehicles to egress the parking facility based at least in part on the corresponding times t1 and t2;
assign a timestamp to each of the egress times, resulting in timestamped egress times;
estimate a current egress time of the parking facility based at least in part on the timestamped egress times;
determine an action recommendation for a driver associated with a particular vehicle currently parked in the parking facility based at least in part on the current egress time of the parking facility; and
an output port operably coupled with the controller, the output port configured to output the action recommendation for subsequent viewing by the driver of the particular vehicle.

16. The system of claim 15, wherein the action recommendation comprises a recommended route for the particular vehicle to travel within the parking facility to exit the parking facility and to travel to a desired destination.

17. The system of claim 16, wherein the input port is configured to receive one or more of traffic information and weather information from an external server, and the controller is configured to determine the recommended route based at least in part on one or more of the traffic information and the weather information.

18. The system of claim 17, wherein the action recommendation comprises a recommended time to leave the parking spot of the parking facility to reach the desired destination along the recommended route by a desired time.

19. The system of claim 18, wherein the input port is configured to receive calendar information from a calendar associated with the driver of the particular vehicle, wherein the calendar includes one or more of the desired destination and the desired time.

20. A device comprising:
a display;
a cellular transceiver;
a controller operably coupled with the cellular transceiver, the controller configured to:
transmit a time t1 via the cellular transceiver indicating when a particular vehicle carrying the device leaves a parking spot within a parking facility before reaching an exit of the parking facility;
transmit a time t2 via the cellular transceiver indicating when the particular vehicle reaches the exit of the parking facility;
receive an action recommendation for a driver associated with the particular vehicle based at least in part an egress trend that is based at least in part on times t1 and t2 received from other vehicles; and
display the action recommendation on the display.

* * * * *